United States Patent [19]

Sjardijn

[11] Patent Number: 5,081,208
[45] Date of Patent: Jan. 14, 1992

[54] POLYMERIZATION OF DICYCLOPENTADIENE

[75] Inventor: Willem Sjardijn, Amsterdam, Netherlands

[73] Assignee: Shell Oil Company, Houston, Tex.

[21] Appl. No.: 595,716

[22] Filed: Oct. 9, 1990

Related U.S. Application Data

[63] Continuation of Ser. No. 306,134, Feb. 6, 1989, abandoned.

[30] Foreign Application Priority Data

Mar. 30, 1988 [GB] United Kingdom ............... 8807590

[51] Int. Cl.⁵ ..................... C08G 61/08; C08F 4/62
[52] U.S. Cl. ..................... 526/166; 526/190; 526/283; 502/102; 502/154; 264/328.6
[58] Field of Search ............. 526/282, 166, 190, 283; 502/102, 154; 264/328.6

[56] References Cited

U.S. PATENT DOCUMENTS

| | | | |
|---|---|---|---|
| 3,631,010 | 12/1971 | Witte | 260/82.1 |
| 3,708,556 | 1/1973 | Nutzel et al. | 260/931 |
| 4,011,386 | 3/1977 | Matsumoto et al. | 526/259 |
| 4,357,449 | 11/1982 | Yi | 526/283 X |
| 4,400,340 | 8/1983 | Klosiewicz | 264/328.6 |
| 4,507,453 | 3/1985 | Tom | 526/283 |
| 4,729,976 | 3/1988 | Sjardijn et al. | 502/102 |
| 4,748,216 | 5/1988 | Tom | 526/283 X |
| 4,837,188 | 6/1989 | Laval et al. | 502/107 |

FOREIGN PATENT DOCUMENTS 0222432 5/1987 European Pat. Off. ............ 526/283

*Primary Examiner*—Fred Teskin

[57] ABSTRACT

A process is described for the polymerization of dicyclopentadiene using a novel catalyst system comprising (a) a tungsten compound which is the reaction product of a tungsten halide with a phenol which is not substituted with a bulky alkyl group at positions ortho with respect to the hydroxyl group, and (b) a trihydrocarbyl tin hydride.

23 Claims, No Drawings

POLYMERIZATION OF DICYCLOPENTADIENE

This is a continuation of application Ser. No. 306,134, filed Feb. 6, 1989, now abandoned.

BACKGROUND OF THE INVENTION

The invention relates to a process and catalyst system for the polymerization of dicyclopentadiene.

U.S. Pat. No. 4,400,340 relates to a process for the manufacture of a thermoset homopolymer by combining a reactant stream containing a metathesis catalyst and a second reactant stream containing an activator for the metathesis catalyst, at least one of the streams further containing dicyclopentadiene monomer, to form a reaction mixture which is then injected into a mold where polymerization of the monomer occurs. The catalyst may be a tungsten-containing compound solubilized by the addition of a small amount of a phenolic compound such as phenol, alkylphenols and halogenated phenols, with tert-butyl phenol, tert-octyl phenol and nonyl phenol being preferred. The starting dicyclopentadiene for this process employing an activator-containing metathesis catalyst system must be essentially pure.

U.S. Pat. No. 4,729,976 relates to a process for the bulk polymerization of dicyclopentadiene by contacting it with a catalyst system comprising (i) a tungsten compound which contains a phenyl group carrying a bulky alkyl group and (ii) an organic tin compound containing one hydrogen atom bound to the tin atom. This process has the advantages that the starting dicyclopentadiene need not be essentially pure, and that the catalyst is more stable and less sensitive to oxygen.

The processes described above can be applied in a reaction injection molding (RIM) process. This process involves mixing two or more low-viscosity streams of components of the catalyst system and injecting the combined streams in monomer solution into a mold, where the monomer polymerizes to form a solid infusible mass.

One requirement for a RIM process is that the catalyst system promote a high polymerization rate. Furthermore, it is desirable that the polymerization start at ambient temperature, for example in the range of from 15° to 30° C., so that the compounds of the catalyst system can be mixed without addition of heat.

It is thus an object of the present invention to enhance the rate of polymerization of dicyclopentadiene by providing a more active tin-containing catalyst system.

SUMMARY OF THE INVENTION

According to the invention, there is provided a catalyst system and process for the polymerization of dicyclopentadiene, which process comprises contacting dicyclopentadiene with a catalyst system comprising (a) a tungsten compound obtainable by combining a tungsten halide with an optionally substituted phenol, which phenol is not substituted with a bulky alkyl group at the positions ortho with respect to the hydroxyl group, and (b) an organo tin hydride of general formula I

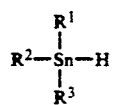

(I)

in which $R^1$, $R^2$ and $R^3$ each represent an optionally substituted alkyl group having in the range of from 1 to 20 carbon atoms, an optionally substituted cyclo-alkyl group having in the range of from 3 to 6 carbon atoms in the cycloalkyl ring, or an optionally substituted phenyl group.

DETAILED DESCRIPTION OF THE INVENTION

The tungsten halide for the preparation of component (a) may be a bromide, but is preferably a chloride, most preferably tungsten hexachloride or tungsten oxytetrachloride ($WOCl_4$).

The phenol is one which is non-substitued with a bulky alkyl group at the positions ortho with respect to the hydroxyl group, which is to say that any carbon atom attached to the aromatic nucleus of the phenol should not be tertiary or quaternary. Preferably, the phenol is a monocyclic halophenol in which the halogen atoms are attached to the aromatic nucleus. Among the halophenols, fluorophenols are preferred, but chlorophenols and bromophenols may be used. Very high reaction rates are obtained when polyfluorophenols are used. The highest rates of polymerization are obtained when the polyfluorophenol carries four or five fluorine atoms. Examples of such phenols are 2,3,4,5-tetrafluorophenol, 2,4,5,6-tetrafluorophenol and 2,3,5,6-tetrafluorophenol. Very good results have been obtained with 2,3,5,6-tetrafluorophenol and pentafluorophenol. An advantage of the use of such very active catalytic systems is that only very little thereof need be used.

Other examples of suitable halophenols are 2-fluorophenol, 3-fluorophenol, 4-fluorophenol, 2,3-difluorophenol, 2,4-difluorophenol, 2,5-difluorophenol, 2,6-difluorophenol, 3,4-difluorophenol, 3,5-difluorophenol, 2,3,4-trifluorophenol, 2,3,5-trifluorophenol, 2,3,6-trifluorophenol and 3,4,5-trifluorophenol, 2,4,5-trifluorophenol and 2,4,6-trifluorophenol, and the corresponding bromo- and chlorophenols. Further examples of suitable but non-preferred phenols are phenol, o-cresol, m-cresol, p-cresol, 2-ethylphenol, 3-ethylphenol, 4-ethylphenol, 2-propylphenol, 3-propylphenol, 4-propylphenol, 3-isopropylphenol, 4-isopropylphenol, 2-butylphenol, 3-butylphenol, 4-butylphenol, 3,4-diisopropylphenol, 3,4-diisobutylphenol and 3,4-di-tert-butylphenol.

Very high polymerization rates are also obtained when the phenol is a monocyclic phenol having a trihalomethyl substituent attached to the aromatic nucleus. The trihalomethyl substituent is preferably a trifluoromethyl group, but may be a trichloromethyl or tribromomethyl group. Very good results have been obtained with 3-trifluoromethylphenol. Other examples of such phenols are 2-trichloromethylphenol, 4-trifluoromethylphenol, 2-trifluoromethylphenol, 3-chlorodifluoromethylphenol, 3-dichlorofluoromethylphenol and 3-tribromomethylphenol. Mixtures of such phenols may be used, for example 4-fluorophenol and p-cresol.

Component (a) may be prepared in a suitable solvent. Examples of such solvents are cyclopentane, cyclohexane, benzene, toluene, o-, m- and p-xylene, chlorobenzene and 1,2-dichlorobenzene. Suitably, a molar ratio of phenol to tungsten in the range of from 1:1 to 10:1, preferably 1:1 to 3:1 is used. The preparation of component (a) may take place by suspending a tungsten halide in the solvent and adding the phenol to the suspension formed, stirring the reaction mixture and blowing a stream of a dry inert gas, for example nitrogen, through the mixture to remove the hydrogen halide which is formed.

Component (b) is preferably a tin compound of the above general formula I in which $R^1$, $R^2$ and $R^3$ each represent an alkyl group having in the range of from 1 to 20 and, in particular, 1 to 10 carbon atoms. Tributyl tin hydride is most preferred. Other examples of suitable tin compounds are tripropyl tin hydride, tripentyl tin hydride, methyldicyclohexyl tin hydride, cyclopentyl-dimethyl tin hydride, trioctyl tin hydride, triphenyl tin hydride and phenyldimethyl tin hydride. Examples of substituents in $R^1$, $R^2$ and $R^3$ are alkoxy groups having in the range of from 1 to 20 carbon atoms and chlorine and fluorine atoms.

The process according to the present invention can be carried out at a molar ratio of tungsten to dicyclopentadiene and a molar ratio of tin compound of the general formula I to tungsten which are not critical and which may vary within wide ranges. Preferably, the W:monomer ratio is in the range of from 1:10,000 to 1:100, preferably 1:1,000 to 1:5,000, and the Sn:W ratio is in the range of from 15:1 to 1:1, preferably 12:1 to 3:1.

Polymerization of dicyclopentadiene includes copolymerization thereof with less than 50% by weight of another monomer, calculated on dicyclopentadiene.

A technical grade of dicyclopentadiene may be used which may contain impurities distilling below a top temperature of 100° C. at a pressure of 12,400±400 Pa. Such impurities usually form azeotropic mixtures with dicyclopentadiene. The technical grade may contain, for example, at least 83% by weight of pure dicyclopentadiene. An advantage of the use of such technical grades is that they are usually liquid at ambient temperature, about 20° C., while pure endo-dicyclopentadiene has a melting point of 32° C. Commercially, dicyclopentadiene is usually available in the endo form, but, if desired, the exo form may be used, or mixtures of the endo and exo form. The technical grade of DCPD is preferably obtained by dimerization of a technical grade of cyclopentadiene, which, in turn, is obtained by fractional distillation of the products obtained by cracking of hydrocarbons, for example a naphtha fraction, in the presence of steam.

The process according to the present invention can be carried out in the presence of an anti-oxidant without disturbing the polymerization. An example of a suitable anti-oxidant is 2,6-di-tert-butyl-4-methylphenol, which is known under the trade mark "Ionol" CP.

Generally, the polymerization takes place in bulk, but components (a) and (b) may be dissolved in a small amount of solvent, such as toluene. It is preferred to use, however, the dicyclopentadiene monomer as a solvent for at least one of the two components. For the tin compound, no solvent at all may also suffice, since the tin compound is usually a liquid at ambient temperature.

A preferred method for the polymerization of dicyclopentadiene is to first mix a stream of component (a) with a stream of component (b) in the presence of dicyclopentadiene monomer introduced in at least one of the streams, and then to subject the mixture to polymerization conditions. For example, it is possible to dissolve component (a) in dicyclopentadiene and to dissolve component (b) in dicyclopentadiene or in another solvent, or to use the tin hydride without solvent. After both streams have contacted with each other, the resulting mixture is preferably injected or poured into a mold, where polymerization of the dicyclopentadiene takes place.

Component (a) and component (b) may be stored in dicyclopentadiene for some time, provided that the dicyclopentadiene contains not more than a few parts per million (ppm) by weight of water. Component (b) is storable in dicyclopentadiene for one to two months without loss of activity.

The process according to the present invention may be carried out in the presence of auxiliary materials, for example fillers, fibers, anti-oxidants, tougheners, stabilizers, pigments and plasticizers.

The catalytic system used in the process is specifically of interest for reaction injection molding or casting. Because of the low viscosity of the dicyclopentadiene/catalyst system mixture, the polymerization is very suitable for large castings with intricate molds. The process is usually carried out at an average polymerization temperature in the range of from 50° C. to 200° C. It is a favorable feature of the present invention that the components (a) and (b) of the catalytic system are very stable.

The polydicyclopentadiene obtained by the process according to the invention may be subjected to a subsequent heat treatment at a temperature in the range of from about 200° C. to 300° C. for about one hour or longer. By this heat treatment, the glass transition temperature of the polymer is increased, for example, from a starting value of about 125° C. to about 160° C., which renders the polymer more useful.

The process according to the invention allows quantitative polymerization, the polydicyclopentadiene being free from dicyclopentadiene monomer. For this reason the polydicyclopentadiene is free from odor and can be used for a large number of applications, for example for structural composites, for example in the automotive industry, and application in the electrical industry, for example in printed circuit boards.

EXAMPLES

The following examples further illustrate the invention. In the examples, the starting dicyclopentadiene (DCPD) was a technical grade having an initial boiling point of 90° C. and of which 3.0% was distilled over at a temperature of 100° C. and a pressure of 12,000 Pa, the distillation being carried out in a column having 14 theoretical trays. The DCPD was dried by contacting with a 4A molecular sieve until it contained less than 1 part per million by weight of water. The resulting DCPD contained (% by weight) 3.5% isopropenyl-2-norbornene, 1.1% 5-cis and trans-1-propenyl-2-norbornene, and 0.7% 5-methyltetrahydroindene.

In each experiment, a 30 ml serum cap bottle was charged with 10 ml DCPD and catalyst prepared as described below, using a molar ratio of DCPD to tungsten of 4000 (except in Example 2, where the molar ratio was 2000). Then, tributyl tin hydride was added in such an amount that the molar ratio of tin to tungsten was 9. For each experiment, the time required to obtain the maximum temperature in the bottle was measured, this time being an indication of the activity of the catalytic system used.

The results are shown in Table 1.

EXAMPLES 1 and 2

$WCl_6$ (5.0 mmol) was suspended in dried toluene (40 ml) under a dry nitrogen atmosphere. p-Tert-butylphenol (5.5 mmol) in toluene (10 ml) was added over a period of 5 minutes at ambient temperature. After completion of the reaction, a homogeneous solution was obtained to which benzonitrile (0.006 mmol) was added to suppress cationic polymerization and to make the catalyst component storage stable in dicyclopentadiene.

COMPARATIVE EXPERIMENT A $WCl_6$ (10.0 mmol) was weighed in a dried serum cap bottle and dissolved in dried toluene (100 ml) at 95° C. under a dry nitrogen blanket. Dried 2,6-diisopropylphenol (20.0 mmol) was added in 5 minutes. The evolved HCl was collected in an excess of an aqueous sodium hydroxide solution. The reaction mixture was kept for 4 hours at 95° C. The catalyst was isolated by evaporation of the solvent.

EXAMPLE 3

$WCl_6$ (1.73 mmol) was suspended in dried cyclopentane (10 ml) under a dry nitrogen blanket. Pentafluorophenol (3.5 mmol) in cyclopentane (10 ml) was added at ambient temperature. After completion of the reaction, the catalyst was isolated by evaporation of the solvent.

EXAMPLE 4

$WCl_6$ (1.73 mmol) was suspended in dried cyclopentane (10 ml) at ambient temperature under a dry nitrogen blanket. 2,3,5,6-Tetrafluorophenol (3.5 mmol) in cyclopentane (10 ml) was added. After completion of the reaction, the catalyst was isolated by evaporation of the solvent.

EXAMPLE 5

$WCl_6$ (1.73 mmol) was suspended in dried cyclopentane (10 ml) at ambient temperature under a dry nitrogen blanket. 2-Fluorophenol (3.5 mmol) in cyclopentane (10 ml) was added. After completion of the reaction, the catalyst was isolated by evaporation of the solvent.

EXAMPLE 6

$WCl_6$ (1.73 mmol) was suspended in dried cyclopentane (10 ml) under a dry nitrogen blanket. 4-Fluorophenol (3.5 mmol) in cyclopentane (10 ml) was added at ambient temperature. After completion of the reaction, the catalyst was isolated by evaporation of the solvent.

EXAMPLE 7

$WCl_6$ (1.73 mmol) was suspended in dried cyclopentane (10 ml) under a dry nitrogen blanket. Phenol (3.5 mmol) in cyclopentane (10 ml) was added at ambient temperature. After completion of the reaction, the catalyst was isolated by evaporation of the solvent.

EXAMPLE 8

$WCl_6$ (1.73 mmol) was suspended in dried cyclopentane (10 ml) under a dry nitrogen blanket. p-Tert-butyl phenol (3.5 mmol) in cyclopentane (10 ml) was added at ambient temperature. After completion of the reaction the catalyst was isolated by evaporation of the solvent.

COMPARATIVE EXPERIMENT B $WCl_6$ (1.73 mmol) was suspended in dried cyclopentane (10 ml) under a dry nitrogen blanket. 2,6-Diisopropylphenol (3.5 mmol) in cyclopentane (10 ml) was added at ambient temperature. After completion of the reaction, the catalyst was isolated by evaporation of the solvent.

DESCRIPTION OF THE POLYMERIZATION EXPERIMENTS

TABLE 1

| Example | Comparative Experiment | Time required to obtain the maximum temperature, min | Maximum temperature, °C. |
|---|---|---|---|
| 1[1] | | 3 | 170 |
| 2[1] | | 0.3 | 170 |
| | A[2] | 5 | 180 |
| 3[1] | | 0.3 | 175 |
| 4[1] | | 1 | 175 |
| 5[2] | | 2.5 | 190 |
| 6[1] | | 3.5 | 175 |
| 7[2] | | 3.5 | 180 |
| 8[2] | | 3 | 180 |
| | B[2] | 8.5 | 190 |

[1] The polymerization started at 20° C. and, therefore, the bottle was kept in air of this temperature.
[2] The polymerization did not start at 20° C. so the bottle was kept in an oil bath having a temperature of 90° C.

In Example 1, where p-tert-butylphenol was used and where heating the bottle was not necessary, a considerably shorter time was observed than in Comparative Experiment A, in which 2,6-diisopropylphenol (carrying a bulky o-substituent) was used and the bottle had to be heated.

Comparison of Examples 1 and 2 shows that doubling the concentration of the catalytic system in DCPD resulted in a reduction of the time to only 0.3 min.

In Examples 3 and 4, where pentafluorophenol and 2,3,5,6-tetrafluorophenol were used, respectively, heating of the bottle was not necessary and very short reaction times were observed.

In Examples 5, 6, 7 and 8, in which 2-fluorophenol, 4-fluorophenol, phenol and p-tert-butylphenol were used, respectively, considerably shorter reaction times were observed than in Comparative Expirement B, in which 2,-6-diisopropylphenol was used.

Some typical properties of the polydicylopentadiene obtained according to Examples 1 and 2 are presented in Table 2.

TABLE 2

| Property | Test Method | Unit | Value |
|---|---|---|---|
| Flexural properties | ASTM D 790 | | |
| Modulus | | GPa | 1.85 |
| Strength | | MPa | 75 |
| Compressive properties | ISOR 604 | | |
| Modulus | | GPa | 1.6 |
| Strength | | MPa | 72 |
| Vicat softening temperature | ISO 306, B | °C. | 140 |
| Izod impact strength | ASTM D 256 (notched) | $kJ \cdot m^{-2}$ | 5 |
| Glass transition temperature | DSC | °C. | 140 |

Examples 9, 10 and 11

Example 4 was repeated, with the exception that 2,3,5,6-tetrafluorophenol (3.5 mmol) was replaced with another phenol (3.5 mmol). Table 3 below shows the phenols used, the time required to obtained the maximum temperature, and the maximum temperature reached.

TABLE 3

| Example | Phenol | Time required to obtain the maximum temperature, min | Maximum temperature, °C. |
|---|---|---|---|
| 9[2] | 2-chlorophenol | 2.5 | 190 |
| 10[1] | pentachlorophenol | 2 | 180 |

TABLE 3-continued

| Example | Phenol | Time required to obtain the maximum temperature, min | Maximum temperature, °C. |
|---|---|---|---|
| 11[1)] | 3-trifluoromethylphenol | 3 | 180 |

For [1)] and [2)] see Table 1

Comparison of Example 3 with Example 10 shows that use of pentafluorophenol instead of pentachlorophenol results in a considerably shorter reaction time. Examples 9 and 11 show that by replacing pentachlorophenol used in Example 10 with 2-chlorophenol and 3-trifluoromethylphenol, respectively, longer reaction times are obtained, but still shorter than with 2,6-diisopropylphenol in Comparative Experiment B.

What is claimed is:

1. A composition comprising:
   (a) a tungsten compound which is the reaction product of a tungsten halide with a phenol selected from the group consisting of halophenols and trihalomethyl substituted phenols, and
   (b) a tin compound of general formula I $$R^2-\underset{\underset{R^3}{|}}{\overset{\overset{R^1}{|}}{Sn}}-H \quad (I)$$

in which each of $R^1$, $R^2$ and $R^3$ is selected from substituted or unsubstituted $C_{1-20}$ alkyl groups, cyclo-alkyl groups having in the range of from 3 to 6 carbon atoms in the cycloalkyl ring, and phenyl groups.

2. The composition of claim 1 in which the phenol is a halophenol.

3. The composition of claim 1 in which the phenol is a trihalomethyl substituted phenol.

4. The composition of claim 2 in which the phenol is a polyfluorophenol.

5. The composition of claim 1 in which the tin compound is present in the composition in a molar ratio with respect to the tungsten compound within the range of 12:1 to 3:1.

6. The composition of claim 1 in which the tin compound is selected from the group consisting of tributyl tin hydride, trioctyl tin hydride and triphenyl tin hydride.

7. A process for the polymerization of dicyclopentadiene which process comprises contacting, in a reaction mixture under polymerization conditions, dicyclopentadiene and a catalyst system comprising:
   (a) a tungsten compound which is the reaction product of a tungsten halide with a phenol selected from the group consisting of halophenols and trihalomethyl substituted phenols, and
   (b) a tin compound of general formula I $$R-\underset{\underset{R}{|}}{\overset{\overset{R}{|}}{Sn}}-H \quad (I)$$

in which each R is independently selected from substituted or unsubstituted $C_{1-20}$ alkyl, $C_{3-6}$ cycloalkyl and phenyl.

8. The process of claim 7 in which the tungsten halide comprises tungsten oxytetrachloride.

9. The process of claim 7 in which the tungsten halide comprises tungsten hexachloride.

10. The process of claim 7 in which the phenol is a halophenol.

11. The process of claim 10 in which the halophenol is a fluorophenol.

12. The process of claim 11 in which the fluorophenol is a polyfluorophenol.

13. The process of claim 12 in which the polyfluorophenol is selected from tetrafluorophenols and pentafluorophenols.

14. The process of claim 13 in which the polyfluorophenol is 2,3,5,6-tetrafluorophenol.

15. The process of claim 8 in which the phenol is selected from the group consisting of 2-chlorophenol, 2-fluorophenol, 4-fluorophenol, 4-chlorophenol, 2,3,5,6-tetrafluorophenol, 3-trifluoromethylphenol, pentachlorophenol and pentafluorophenol.

16. The process of claim 7 in which the phenol is a trihalomethylsubstituted phenol.

17. The process of claim 16 in which the trihalomethyl substituent is a trifluoromethyl group.

18. The process of claim 7 in which the tungsten compound is present in the reaction mixture in a molar ratio, based on moles of dicyclopentadiene, within the range of about 1:1000 to about 1:5000.

19. The process of claim 7 in which each R in general formula I represents a $C_{1-10}$ alkyl group.

20. The process of claim 19 in which the compound of general formula I is tributyltinhydride.

21. A process for the in-mold polymerization of dicyclopentadiene which comprises
   (a) introducing into a mold a reaction mixture comprising dicyclopentadiene, a tungsten compound which is the reaction product of a tungsten halide with a phenol selected from the group consisting of halophenols and trihalomethyl substituted phenols, and a tin hydride of general formula I $$R^2-\underset{\underset{R^3}{|}}{\overset{\overset{R^1}{|}}{Sn}}-H \quad (I)$$

in which each of $R^1$, $R^2$ and $R^3$ is selected from substituted or unsubstituted $C_{1-20}$ alkyl groups, cyclo-alkyl groups having 3 to 6 carbon atoms in the cycloalkyl ring, and phenyl groups and
   (b) maintaining the reaction mixture under polymerization conditions for a time sufficient for polymerization of the dicyclopentadiene and formation of a molded article.

22. The process of claim 21 in which the reaction mixture is formed by contacting a first stream comprising the tungsten compound and a second stream comprising the tin hydride, at least one of said first and second streams further comprising dicyclopentadiene.

23. The process of claim 22 in which the phenol is selected from the group consisting of 2-chlorophenol, 2-fluorophenol, 4-chlorophenol, 2,3,5,6-tetrafluorophenol, 3-trifluoromethyl phenol, pentachlorophenol and pentafluorophenol.

* * * * *